Feb. 24, 1925.
A. H. PAPE
1,527,437
VEHICLE SPRING
Filed May 4, 1922
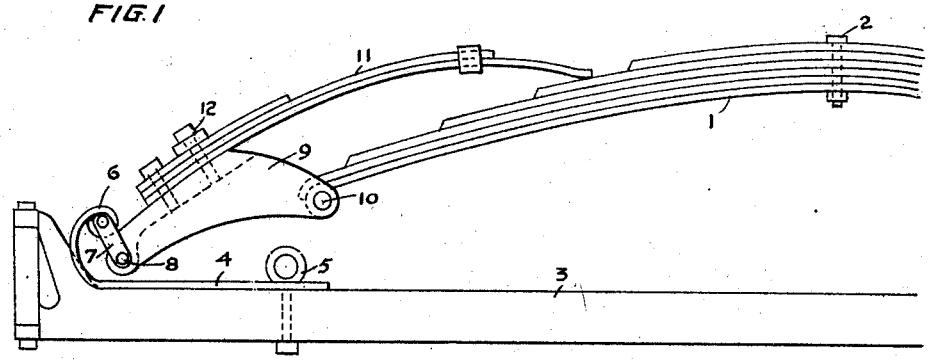
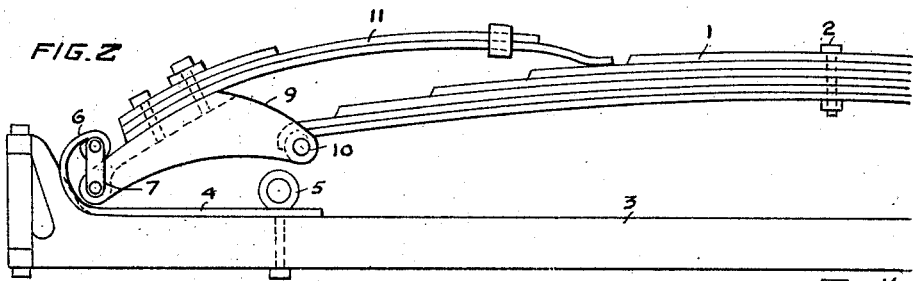
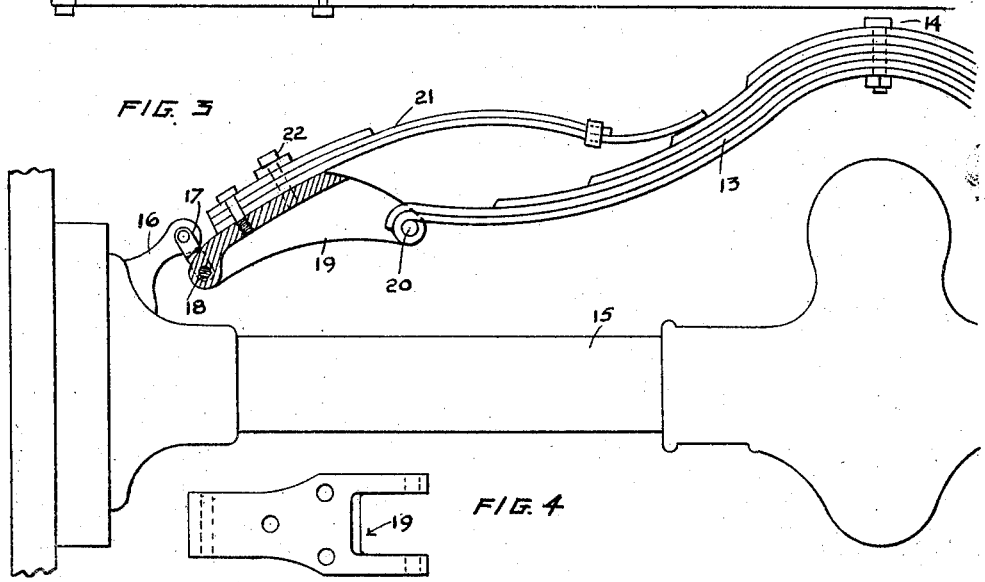
INVENTOR
A. H. PAPE
ATT'YS.

Patented Feb. 24, 1925.

1,527,437

UNITED STATES PATENT OFFICE.

AUGUST H. PAPE, OF KENTFIELD, CALIFORNIA.

VEHICLE SPRING.

Application filed May 4, 1922. Serial No. 558,455.

*To all whom it may concern:*

Be it known that I, AUGUST H. PAPE, a citizen of the United States, residing at Kentfield, in the county of Marin and State of California, have invented new and useful Improvements in Vehicle Springs, of which the following is a specification.

This invention relates to improvements in vehicle springs and has particular reference to a simply constructed, inexpensive, strong and durable spring which will absorb shocks in a reliable and effective manner without transmitting sudden and violent shocks to the vehicle body either when compressed or expanded, whereby the riding qualities of the vehicle will be improved by use of the springs.

An object of the invention is to provide means to be used in connection with the laminated leaf type of vehicle spring, which will cause the spring to absorb shocks and jars in a smooth and even manner such that the spring will not be too quickly contracted nor be allowed to too quickly expand, without detracting from the cushioning action of the spring, the said means being of such construction that it may be readily attached to the ordinary type of semi-elliptic or like leaf vehicle springs without necessitating materially changing the construction of such springs.

A further object of the invention is to provide a vehicle spring of the character described which will act as a shock preventer and absorber in a highly effective and reliable manner, the parts being so arranged that rattling thereof will be eliminated.

The invention possesses other advantages and features some of which, with the foregoing will be set forth at length in the following description where I shall outline in full that form of the invention which I have selected for illustration in the drawings accompanying and forming a part of the present specification. In said drawings I have shown one form of the construction of my invention, but it is to be understood that I do not limit myself to such form since the invention as expressed in the claims may be embodied in a plurality of forms.

Referring to the drawing:

Fig. 1 represents a fragmentary front elevation of the spring of my invention as applied to the front axle of a vehicle, part of the axle being shown.

Fig. 2 is a view similar to Fig. 1 but showing the spring as when under compression.

Fig. 3 is a fragmentary elevation of the spring as when applied to the rear axle of a vehicle, part of which latter is shown and part of the spring being shown in section, for the sake of clearness of illustration.

Fig. 4 is a top plan view of one of the shackle elements of the spring of my invention.

Fig. 5 is a fragmentary front elevation of a slightly modified form of spring as used on the front axle of a vehicle, part of which latter is shown.

Referring particularly to the invention as illustrated in the accompanying drawing, 1 designates a load sustaining member which in this instance is represented as a leaf vehicle spring of the semi-elliptic type, made up in the customary manner with a plurality of leaves secured one upon the other. This spring is adapted to be attached intermediate of its ends by means, part of which is shown at 2, to the body of the vehicle, (not shown), whereas the ends of the spring are adapted to be connected with the portions of a vehicle axle 3.

I shall describe the connection with the front axle of the vehicle as shown in Figs. 1 and 2. The spring 1 extends substantially parallel to and above the front axle 3, with its ends disposed in inwardly spaced relation to the ends of said axle. To facilitate the attachment of the spring to the axle, I provide at each end of the axle a securing strip or bracket 4, which is secured by means 5 to and rests upon the upper side of the axle. The bracket 4 has an upwardly turned outer end portion provided with an eye 6 in which is pivoted one end of a shackle or link 7. This link or shackle 7 extends downwardly from the eye and at its lower end is pivoted as at 8 to a link or shackle member 9, which latter is preferably in the form of a casting, the other end of the link or shackle member 9 is bifurcated and receives in the bifurcation one end of the spring 1, said spring being pivoted as at 10 to said link 9. Supported by the member 9 is an auxiliary leaf spring 11, which extends inwardly over the spring 1 and at its extended end engages upon the spring 1 at a point between one end thereof and by which the said spring 1 is secured to the vehicle. This spring 11 may be rigidly attached to the member 9 at its other end by means of bolts 12, or other fastening elements. The secured end being located preferably, at a point intermediate of the pivoted ends and upon the upper side of the member 9. It will thus be seen that the bracket 4 by means of the grooved upwardly extending outer end, eye 6 and shackle 7, supports the link 9 in upwardly spaced relation over the axle and provides for an effective attachment of the adjacent end of the main spring to the axle in this manner. When a compression force is subjected to the main spring and it tends to straighten out as shown in Fig. 2, in such compression, the member 9 will move downwardly and outwardly as shown in Fig. 2, in such manner that the inner end of the spring 11 will press downwardly under the force of compression of said spring 11 and to a certain extent resist compression of said spring 11 and to a certain extent resist compression extending action of the main spring. It will thus be seen that both the main and auxiliary springs are placed under compression when a load is applied to the main spring and that the auxiliary spring resists the compression action of the main spring so as to prevent the transmission of sudden shocks and jars to the vehicle and likewise when the spring 1 expands upon release of the load, the spring 11 will resist such movement as to prevent a sudden rebounding action.

As shown in Fig. 3, the main spring 13 is adapted to be attached by means 14, not shown, in the same manner as is the spring 1, and is likewise disposed in superposed parallel relation to the rear axle 15. The rear axle 15 may cary a bracket 16 adjacent each end and from this bracket a hanger or shackle 17 depends in the same manner as does the shackle 9. The shackle 17 is pivotally connected at its lower end with one end of the shackle member 19 corresponding to the one 9. The shackle 19 being pivoted as at 20 to the spring 13. An auxiliary leaf spring 21 corresponding to the leaf spring 11 is attached by means 22 to the shackle 19 and bears upon the upper side of the spring 13 in the same manner as does the spring 11. In all respects the arrangement of the parts of the spring of my invention for the front and rear axles is the same except as to the brackets 4 and 16, and as to the shape of the spring which, however, does not cause the principle of operation to vary, as to the two types of spring.

As shown in Fig. 5, I have provided a slightly modified form of spring in which the main spring 22 is of the same structural arrangement as the other springs, but is pivoted at one end to a downwardly and inwardly curved bracket 23, which is rigidly fastened by means 24 to an auxiliary spring 25 at a point intermediate of the ends of said auxiliary spring. The auxiliary spring 25 bears upon the upper side of the spring 22 at a point between the mediate point of said spring 22 and one of the ends of said spring, whereas the other end of the auxiliary spring is connected by a shackle 26 with the bracket 27, which is identical in its construction to the bracket 4. The difference in this form is that the auxiliary spring is connected directly with the bracket by means of a shackle and supports the rigid member 23 which is pivotally connected with the end of the spring 22 instead of being supported by the member 23, which latter corresponds to the member 19. The action of this spring is the same as the spring heretofore described, since when the main spring tends to lengthen or straighten out under compression, it causes the auxiliary spring to be placed under compression and to press downwardly upon and resist compression movement of the main spring. This action will also prevent sudden rebounding of the main spring in the same manner as in the preferred forms of construction of my invention.

While I have shown the spring as extending parallel to the vehicle axle, it is to be understood that I do not wish to be limited to this arrangement in the practical application of my invention since I may by inverting the springs, extend them lengthwise of the vehicle and obtain the same result, the springs then being arranged so that they bow upwardly and that the auxiliary springs engage the under sides of the main springs instead of the upper sides.

By the use of the means of my invention, the main springs are materially lengthened and a more effective cushioning action is thus provided without weakening the spring or causing it to transmit objectionable shocks and jars to the vehicle.

When the spring is reversed the ends of the spring are attached to the frame and an intermediate portion to the axle of the vehicle. However, in either event, a portion of the spring is rigidly connected with a part of the vehicle and an end of the spring is pivotally connected with another part of the vehicle, since the axle and frame of the vehicle are both parts of the vehicle as a whole.

I claim:

1. The combination with a vehicle and an axle, of a load sustaining member connected intermediate of its ends with the vehicle, rigid members pivoted directly on and extending outwardly in the direction of the length of the load sustaining member at the ends thereof, brackets on the axle, shackles pivoted to and depending from the brackets to which shackles said rigid members are pivoted at their outer ends, leaf springs rigidly secured to said rigid members and at certain ends engaging with the load sustaining member as a point spaced inwardly from the ends of said load sustaining member.

2. The combination with a vehicle of a load sustaining member secured to a part of the vehicle, brackets on another part of the vehicle, shackles pivoted to and arranged to swing free on the brackets, rigid members pivoted on the shackles and on ends of the load sustaining member, springs fixed to said rigid members and having engagement with the load sustaining member.

3. The combination with a vehicle and an axle, of a leaf spring connected wth the vehicle, elongated rigid channel shaped members pivoted directly to and extending outwardly in the direction of the length of the spring at the ends of the latter, brackets on the axle, shackles pivoted to the brackets and extending towards the axle, said shackles and brackets being arranged to permit free swinging movement of the shackles towards and away from the brackets, means for pivotally connecting the ends of said channel shaped members to ends of said shackles and auxiliary springs fixed at certain ends to said channel shaped members at intermediate points thereon, said auxiliary springs engaging the first named spring at points spaced inwardly from the ends of the latter.

AUGUST H. PAPE.